Patented Mar. 14, 1933

1,901,367

UNITED STATES PATENT OFFICE

EMIL GUSTAF TORVALD GUSTAFSSON, OF STOCKHOLM, SWEDEN

PROCESS FOR PRODUCING METALS AND METAL ALLOYS LOW IN CARBON

No Drawing. Application filed February 10, 1930, Serial No. 427,429, and in Sweden February 19, 1929.

My present invention relates to improvements in processes for producing low carbon metals and metal alloys, for instance iron with a carbon content below 0.05%, so called rustless iron and steel and other irons and steels alloyed with carbon-binding metal or metals, e. g. chromium, manganese, tungsten, titanium and vanadium, and ferro-alloys of one or more of these metals, whereby a more complete utilization of the metal oxide or oxides contained in the employed ore or ores will be obtained than in the processes heretofore used.

A method has been developed for producing, for instance iron and steel alloyed with chromium, e. g. rustless iron, directly out of iron ore and chromium ore. According to this method the finely divided ores are mixed with reducing agent, consisting of coal in a finely divided state, if desired in part replaced by thermic reducing agent of known type, whereat, however, the quantity of reducing agent is kept less than the amount theoretically required for complete reduction of the ores. The mixture is then transformed into briquettes and the briquettes are dried or in any other way hardened and thereafter successively supplied into an electric furnace with one or more downwardly directed electrodes capable of being raised and lowered, and reduced and melted while swimming or lying in a relatively thin layer on the slag bath in the furnace. After a suitable quantity of charge has been smelted, there are in the furnace an iron or steel bath comparatively rich in chromium and with a carbon content depending upon how great the deficit of reducing agent is kept in the briquettes and also upon the operation of the furnace, and a slag rich in chromium oxide and ferrous oxide. From this slag part of the chromium and the iron is then extracted by adding ferro-silicon or the like to the slag in presence of the metal in the furnace used. The chromium content in the iron or steel is in this manner increased to the degree required for rustless iron or steel, and at the same time a slag is obtained that is more suitable for the tapping.

It has proved, however, that in this manner only a minor part of the content of iron and, above all, of chromium will be utilized. Already after an addition of ferro-silicon in such a quantity that not quite one third of the chromium content in the slag is reduced, the silicon content in the metal, i. e. the iron or steel, will namely become so high that it influences considerably the properties of the metal both in physical and in chemical respects. Usually a percentage of silicon as low as possible will be desired in the rustless iron; it shall preferably not exceed 0.20 to 0.25%. For other irons and steels, however, other limits of the suitable silicon content may exist, depending among other upon the purpose for which the product will be used.

When producing rustless iron with 0.10% carbon and about 13% chromium according to the method described above, the slag will still contain 12 to 18% chromium oxide and 4 to 8% ferrous oxide. On account of the high content of gangue in the chromium ores, the slag quantity will as a rule be very large or about 1.3 times the weight of the metal obtained, and thus the loss of chromium, especially, will be very important, amounting to about 40 to 50% of the quantity of chromium supplied to the furnace as ore.

Also in other known methods of producing rustless iron and steel wherein chromium ore is reduced and melted by thermic reducing agent, for instance aluminium, ferro-silicon or the like, on or in a slag bath or on or in a steel bath in an electric furnace or an open-hearth furnace, it has proved, that the losses of chromium in the slag have been important, though the slag quantity has thereby been kept comparatively small. This has been the case whether the ore and the reducing agent have been supplied and smelted separately in arbitrary order or in admixture, and in the latter case whether the charge has been in loose or in briquetted state. Also here the cause has been that the reducing agent has been supplied in a considerable deficit in order to keep the content of reducing agent, for instance silicon, in the metal within allowable limits. When using silicon exclusively as reducing agent, it has also proved that, though a certain tested suitable deficit relatively to the quantity of ore having been used, the silicon content in the product has many times considerably exceeded the calculated one and thus a product been obtained which is not useful for the purpose intended.

When producing metals or metal alloys from ores which are difficultly reduced, such as chromium, manganese, tungsten, titanium and vanadium ores, a high percentage of these metals will be obtained as oxides in the slag formed, even when the reducing agent is used in a quantity corresponding to or to some degree exceeding the amount required for a complete reduction of the ore or ores, respectively. The same will be the case if the production is carried out by melting a charge already reduced, consisting, for instance, of briquettes or a loose mixture of the raw materials which have been wholly or partly reduced in a special furnace or in a separate chamber of the melting furnace while using reducing agent in deficit or in a quantity approximately corresponding to the amount required for complete reduction, or if such a charge with reducing agent in excess is melted together with ore or ores or a charge containing reducing agent in deficit additionally supplied to the furnace. The slag formed in melting will thus also be rich in oxides of difficultly reduced metal.

By the present invention a more effective utilization of the metal content of the ores used, above all of metal difficultly reduced, will be attained than in the processes above described, whereby the cost of the production of the low carbon metal or alloy, which is the principal product in the process, will be considerably decreased.

The main object of my present invention is to utilize more completely and suitably the slag rich in metal oxides obtained in reduction and/or melting processes of the kind mentioned above or of any similar kind, and thus, to render the process as a whole more economical.

Another object of my invention is to utilize the content of metal oxides in said slags in such a manner that a greater yield of the low carbon metal or alloy, the principal product, is obtained in the process as a whole than heretofore.

In order to attain this, the slag rich in metal oxides is according to the present invention treated in two stages, which consist in, first adding to the slag in the presence of the low carbon metal, already produced, thermic reducing agent in such a quantity that the resulting metal below the slag contains only an inconsiderable, or the properties of said metal not substantially influencing, amount of the employed reducing agent, and second separating said metal and the slag thus pre-treated and thereafter adding to the slag more reducing agent, thermic or carbonaceous, in such a quantity that a metal rich in said latter reducing agent is obtained from remaining metal oxide or oxides in the slag. In both stages of the treatment heat should be supplied to the furnace used if required for carrying out the process.

The thermic reducing agent consists suitably of silicon, aluminium, calcium or alloys of one or more of these elements and metal or metals, for instance iron, chromium or manganese. The carbonaceous reducing agent in the concluding treatment of the slag consists suitably of charcoal, peat coal, coke, anthracite or graphite, in loose state or in the form of electrodes. The thermic reducing agent may also, if desired, be supplied in the form of electrodes.

For the pre-treatment of the slag with thermic reducing agent suitably the furnace is used in which the reduction and/or melting of the charge for the low carbon product is carried out. Most suited to this treatment are electric furnaces, especially furnaces with electrodes directed against the bath and capable of being raised and lowered, in which furnaces the heat, at least in part, is developed in the form of electric resistance heat in the slag so that the temperature of the slag may easily be controlled by regulating the resistance heat in relation to the total heat developed in the furnace. The invention is, however, not bound to these types of furnaces. Thus, any suitable type of furnace may be used, for instance electric induction furnaces or open-hearth furnaces.

If low carbon thermic reducing agent is used in the concluding treatment the lining of the furnace should be built of practically carbon free materials, so that carbon cannot be taken up from the same by the metal reduced out of the slag. For the same reason the heating of the slag should during the reduction preferably take place with the electrodes out of contact with the slag and the reducing agent lying on the slag if an electric furnace with carbon electrodes is used for the treatment. If carbonaceous material is used as reducing agent the furnace may, on the contrary, be built with, for instance, bottom of stamped carbonaceous mass.

The reducing agent may in the pre-treatment as well as in the after-treatment of the slag be supplied either at one time or, preferably, successively in small portions. If the reducing agent is in an unmolten state it may preferably be added in finely divided form and be spread over as large a portion of the slag surface as possible. During the treatment the slag should be stirred on one or more occasions in order to facilitate the reaction between the reducing agent and the metal oxides in the slag. If required for obtaining a composition of the slag more suited to the furnace lining, or for making the slag more fluid so that it will react more readily with the reducing agent and the reduced metal will better separate from the slag, suitably such slag forming materials, basic or acid, depending upon the composition of the lining, for instance lime, dolomite, clay, quartz or sand, may be added to the slag either simultaneously with or after the reducing agent, as will form a suitable slag with the original slag and the reaction products from the reducing agent.

If thermic reducing agent, for instance ferro-silicon, has been used in producing the principal product proper a stronger acting reducing agent, for instance ferro-silicon higher in silicon, ferro-aluminium-silicon, ferro-aluminium or aluminium, should preferably be used in the after-treatment of the slag.

In the after-treatment of the slag a very great part of the content of valuable metal in form of metal oxides is reduced out of the slag on account of the reducing agent being preferably supplied in a certain excess, the magnitude of which depends upon the percentage desired of the reducing agent in the metal produced at this stage. The slag will after this concluding treatment contain a very small quantity of metal oxides as compared with the slag before the pre-treatment, and, thus, the loss of metal in the slag in the process as a whole will be only insignificant as compared with the losses in the methods hitherto used. This will especially be the case if the quantity of reducing agent in the after-treatment is adapted in such a way that the metal thereby produced contains 10% or more of reducing agent, for instance silicon. However, even if the metal contains only .3 to 5% of reducing agent the utilization will be good. Naturally, lower percentages may also be used. It is evident that the higher the percentage of the reducing agent is kept in the metal, the more completely will the content of metal oxides in the slag be won in the form of metal.

The product rich in reducing agent obtained in the after-treatment of the slag, which product will as a rule have a high percentage of valuable, difficulty reduced metal, for instance chromium or manganese, and thus will be of high value per unit of weight, may either be used for known purposes, for instance in the form of ferro-chromium rich in carbon, if carbonaceous reducing material is used in the after-treatment, or be returned to the process. The latter is especially the case when thermic reducing agent low in carbon is used. The practically carbon-free metal obtained in such a case in the after-treatment may thus suitably be used in the pre-treatment of the slag, as firstly the content of reducing agent in the metal will be utilized for reducing metal oxides out of a new quantity of fresh slag, and secondly its content of reduced, practically carbon-free metals will join the metal bath present in the furnace during the pre-treatment. The percentage of valuable metal, for instance chromium or manganese, in the metal bath will hereby be increased essentially. Instead of obtaining a metal with about 13% chromium in the direct production of rustless iron according to the example previously mentioned, there will according to the present method be obtained from the same quantities of chromite and iron ore, firstly a somewhat greater yield, and secondly about 19% chromium in the metal. If a rustless iron or steel with about 13% chromium should be produced as final product a considerably smaller quantity of chromite can be used in the primary charge than in the unmodified direct process.

The metal rich in reducing agent obtained in the after-treatment of the slag may also be used as addition in the furnace for the production of the principal product, either alone or together with the charge or as an ingredient of the same. If a briquetted charge is used the metal may thus be admixed in finely divided state with the mixture for preparing the briquettes. Of metal rich in carbon, however, only a relatively small quantity can be added if the percentage of carbon in the product shall not be too high. In using metal low in carbon, the reducing agent in same will be utilized in the reduction process and can thus, if desired, be used in its entirety at this stage of the process. However, it is as a rule preferable to use the metal as addition, either alone or together with other reducing agent, for instance ferro-silicon if the metal contains silicon, in the pre-treatment of the slag.

The advantages of the present method for producing low carbon metals and metal alloys are, thus, that the reduction—and/or melting-process proper for producing the principal product may be carried out without paying any great regard to the loss of valuable metal in the form of oxides in the slag, since yet the greatest possible part of said metal oxides will be utilized in the principal product proper without the properties of the product being influenced substantially by the reducing agent used, and the metal oxides thereafter remaining in the slag will also be utilized effectively. In the special case when the product rich in reducing agent is returned to the process the metal of these remaining oxides will also be introduced into the principal product proper.

The invention is not limited to the metals or materials which have hereinbefore been mentioned by way of example only, but comprises any production of metals and metal alloys low in carbon or relatively low in carbon with the use of the method set forth.

What I claim as new and desire to secure by Letters Patent of the United States of America is:—

1. A process for producing metals and metal alloys low in carbon, consisting in reducing and melting a charge containing oxide ore and reducing agent in deficit of the amount theoretically required for complete reduction of the metal oxides in the ore, treating the thereby formed slag rich in metal oxide, in presence of the produced metal poor in constituents of reducing character, with thermic reducing agent in such a quantity as to obtain below the slag a metal bath containing said reducing agent only in a proportion insufficient to substantially influence the properties of the metal produced, separating metal and slag, and treating the slag with reducing agent in such a quantity as to obtain a metal rich in said reducing agent from remaining metal oxide in the slag.

2. A process for producing metals and metal alloys low in carbon, consisting in reducing and melting a charge containing oxide ore and carbonaceous reducing agent in deficit of the amount theoretically required for complete reduction of the metal oxides in the ore, treating the thereby formed slag rich in metal oxide in presence of the low carbon metal thereby produced with thermic reducing agent in such a quantity as to obtain below the slag a metal bath containing reducing agent in a proportion insufficient to substantially influence the properties of the metal produced, separating metal and slag, and treating the slag with reducing agent in such a quantity as to obtain a metal rich in said reducing agent from remaining metal oxide in the ore.

3. A process for producing metals and metal alloys low in carbon, consisting in reducing and melting a charge containing oxide ore of a readily oxidizable heavy metal and reducing agent including carbonaceous material, the reducing agent in deficit of the amount theoretically required for complete reduction of the metal oxides in the ore, treating the thereby formed slag bath rich in oxide of said readily oxidizable heavy metal, in presence of the produced metal bath poor in constituents of reducing character, with thermic reducing agent in such a quantity as to obtain below the slag a metal bath containing reducing agent in a proportion insufficient to substantially influence the properties of the metal produced, separating metal and slag, and treating the slag with thermic reducing agent in such a quantity as to obtain a metal rich in said reducing agent from remaining metal oxide in the slag.

4. A process for producing metals and metal alloys low in carbon, consisting in reducing and melting a charge containing oxide ore and carbonaceous reducing agent in deficit of the amount theoretically required for complete reduction of the metal oxides in the ore, treating the thereby formed slag rich in metal oxide, in presence of the low carbon metal thereby produced, with siliceous thermic reducing agent in such a quantity as to obtain below the slag a metal bath containing silicon in a proportion insufficient to substantially influence the properties of the metal produced, separating metal and slag, and treating the slag with siliceous thermic reducing agent in such a quantity as to obtain a metal rich in silicon from remaining metal oxide in the slag.

5. In a process for producing metals and metal alloys low in carbon wherein a low carbon metalliferous charge containing a readily oxidizable heavy metal is melted under oxidizing conditions, thereby forming a low carbon metal bath and a slag bath rich in oxide of said readily oxidizable metal, the steps of treating said slag bath in presence of said metal bath with thermic reducing agent in such a quantity as to obtain below the slag a metal bath containing reducing agent in a proportion insufficient to substantially influence the properties of the metal produced, separating metal and slag, treating the slag with thermic reducing agent in such a quantity as to obtain a metal rich in said reducing agent from remaining metal oxide in the slag, and further utilizing the contents of reducing agent and of reduced metals in said latter metal by adding the metal to a new quantity of slag, rich in metal oxide and produced in the process, in the first treatment of said slag.

6. A process for producing metals and metal alloys low in carbon, consisting in reducing and melting a charge containing oxide ore of a carbon-binding metal and reducing agent in deficit of the amount theoretically required for complete reduction of the metal oxides in the ore, treating the thereby formed slag rich in metal oxide, in presence of the thereby produced metal poor in constituents of reducing character, with thermic reducing agent in such a quantity as to obtain below the slag a metal bath containing reducing agent in a proportion insufficient to substantially influence the properties of the metal produced, separating metal and slag, treating the slag with thermic reducing agent in such a quantity as to obtain a metal rich in said reducing agent from remaining metal oxide in the slag, and further utilizing the contents of reducing agent and of reduced metals in said latter metal by adding the metal to a new quantity of slag, rich in metal oxide and produced in the process, in the first treatment of said slag.

7. A process for producing metals and metal alloys low in carbon, consisting in reducing and melting a charge containing oxide ore and reducing agent in deficit of the amount theoretically required for complete reduction of the metal oxides in the ore, treating the thereby formed slag rich in metal oxide, in presence of the thereby produced metal poor in constituents of reducing character, with thermic reducing agent in such a quantity as to obtain below the slag a metal bath containing reducing agent in a proportion insufficient to substantially influence the properties of the metal produced, separating metal and slag, treating the slag with thermic reducing agent in such a quantity as to obtain a metal rich in said reducing agent from remaining metal oxide in the slag, and further utilizing the contents of reducing agent and of reduced metal in said latter metal by adding the metal to a new quantity of slag, rich in metal oxide and produced in the process, in the first treatment of same and to a new quantity of the primary charge.

8. A process for producing metals and metal alloys low in carbon, consisting in reducing the melting a charge, containing oxide ore of a carbon-binding metal and carbonaceous reducing agent in deficit of the amount theoretically required for complete reduction of the metal oxides in the ore, treating the thereby formed slag bath rich in metal oxide, in presence of the low carbon metal bath thereby produced, with thermic reducing agent in such a quantity as to obtain below the slag a metal bath containing reducing agent in a proportion insufficient to substantially influence the properties of the metal produced, separating metal and slag, treating the slag with thermic reducing agent in such a quantity as to obtain a metal rich in said reducing agent from remaining metal oxide in the slag, using in both said stages of the treatment of the slag an electric furnace with a downwardly directed electrode capable of being raised and lowered, and supplying the electric heat required for the process with the electrode out of contact with the slag and with the reducing agent on the slag.

9. A process for producing metals and metal alloys low in carbon, consisting in smelting a charge containing oxide ore and thermic reducing agent, the latter in a quantity less than that theoretically required for complete reduction of the metal oxides in the ore, treating the thereby formed slag rich in metal oxide in presence of the low carbon metal thereby produced with thermic reducing agent of a stronger reducing character than that of the reducing agent used in the reduction of the ore, the reducing agent being added to the slag in such a quantity as to obtain below the slag a metal bath containing reducing agent in a proportion insufficient to substantially influence the properties of the metal produced, separating metal and slag, and treating the slag with reducing agent in such a quantity as to obtain a metal rich in said reducing agent from remaining metal oxide in the slag.

10. A process for producing metals and metal alloys low in carbon, consisting in reducing and melting a briquetted charge of intimately mixed finely divided oxide ore and finely divided reducing agent, the latter in a quantity less than that theoretically required for complete reduction of the metal oxides in the ore, on and in a slag bath in an electric furnace provided with a downwardly directed electrode capable of being raised and lowered, treating the thereby formed slag rich in metal oxides in presence of the low carbon metal thereby produced with thermic reducing agent in such a quantity as to obtain below the slag a metal bath containing reducing agent in a proportion insufficient to substantially influence the properties of the metal produced, separating metal and slag, treating the slag with thermic reducing agent in such a quantity as to obtain a metal rich in said reducing agent from remaining metal oxide in the slag, and further utilizing the contents of reducing agent and of reduced metals in said latter metal by adding the metal to a new quantity of slag from the melting of the charge in the first treatment of said slag.

11. A process for producing chromium-iron-alloys low in carbon, consisting in reducing and melting a charge containing chromium oxide, iron oxide and reducing agent, the latter in a quantity less than that theoretically required for complete reduction of the metal oxides in the charge, treating the thereby formed slag bath rich in chromium oxide and ferrous oxide, in presence of the produced metal bath poor in constituents of reducing character, with siliceous thermic reducing agent in such a quantity as to obtain below the slag a metal bath containing silicon in a proportion insufficient to substantially influence the properties of the chromium-iron-alloy produced, separating metal and slag, then treating the slag with siliceous thermic reducing agent in such a quantity as to obtain a chromium-iron-silicon-alloy rich in silicon from remaining metal oxides in the slag, and further utilizing the contents of silicon and of chromium and iron in said latter alloy by adding same to a new quantity of slag, rich in chromium oxide and ferrous oxide and produced in the process, in the first treatment of said slag.

12. A process for producing metals and metal alloys low in carbon, consisting in reducing a charge containing oxide ore of a carbon-binding metal incompletely so that a metallic product containing a considerable amount of unreduced metal oxide is obtained, melting said partly reduced product, thereby forming a low carbon metal bath and a slag bath rich in metal oxide, treating said slag bath in presence of said metal bath with thermic reducing agent in such a quantity as to obtain below the slag a metal bath containing reducing agent in a proportion insufficient to substantially influence the properties of the metal produced, separating metal and slag, and treating the slag with reducing agent in such a quantity as to obtain a metal rich in said reducing agent from remaining metal oxide in the slag.

13. A process for producing metals and metal alloys low in carbon, consisting in reducing a charge containing oxide ore of a carbon-binding metal and reducing agent in deficit of the amount theoretically required for complete reduction of the metal oxides in the ore, melting the metallic product thus obtained, thereby forming a metal bath poor in reducing agent and a slag bath rich in metal oxide, treating said slag bath in presence of said metal bath with thermic reducing agent in such a quantity as to obtain below the slag a metal bath containing reducing agent in a proportion insufficient to substantially influence the properties of the metal produced, separating metal and slag, and treating the slag with reducing agent in such a quantity as to obtain a metal rich in said reducing agent from remaining metal oxide in the slag.

In testimony whereof I affix my signature.

EMIL GUSTAF TORVALD GUSTAFSSON.